Aug. 15, 1967    J. T. W. SIMMS ET AL    3,335,628
CUTTING DIES
Filed Aug. 31, 1965    2 Sheets-Sheet 1
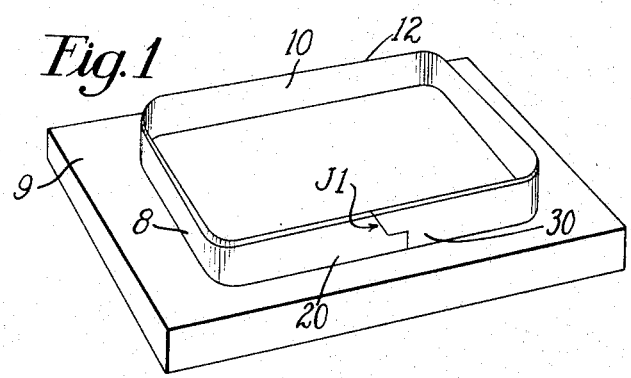
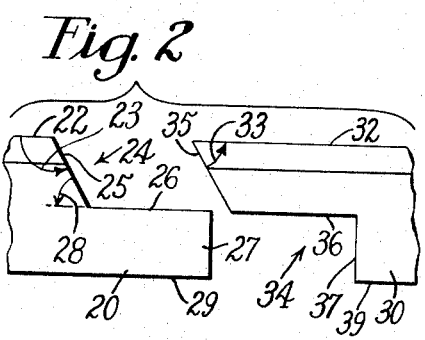
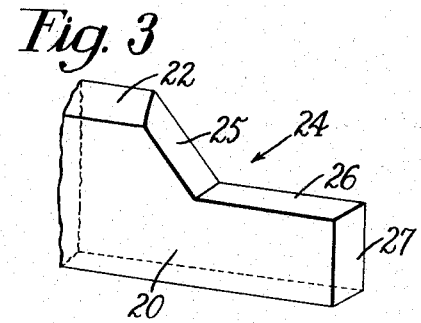
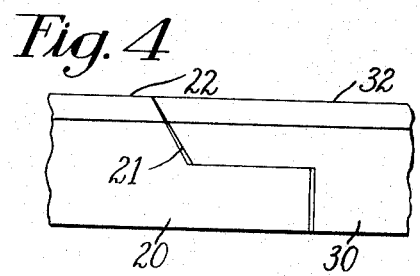
*Inventors*
John T. W. Simms
John J. Taylor
By their Attorney
George C. Fuller

United States Patent Office 3,335,628
Patented Aug. 15, 1967

3,335,628
CUTTING DIES
John T. W. Simms and John J. Taylor, Leicester, England, assignors to United Shoe Machinery Corporation, Flemington, N.J., and Boston, Mass., a corporation of New Jersey
Filed Aug. 31, 1965, Ser. No. 484,026
Claims priority, application Great Britain, Sept. 16, 1964, 37,734/64
7 Claims. (Cl. 83—652)

The present invention, illustrated by two embodiments thereof, is concerned with improvements in or relating to strip steel cutting dies.

A common type of cutting die for press cutting is formed from strip steel provided with a cutting edge, the strip being formed to a desired configuration and closed at a joint by end to end bonding of joint portions of the strip. It is a cutting die of this type which will be meant when the phrase "a strip steel cutting die" is used herein. Strip steel cutting dies often comprise a single cutting edge, and the strip may be mounted in a plywood supporting block; however on occasion the cutting dies may be self-supporting and may, if desired, have opposite edges of the strip provided with a cutting edge.

When making cutting dies of this type according to the usual practice where the joint portions have planar end faces normal to the cutting edges, difficulty is often encountered in minimizing the gap between the cutting edges of the joint portions; even a small gap between the two cutting edges will cause an incomplete cut, which is particularly disadvantageous when fabric is being cut, and the gap tends to open as fibers of the material being cut are formed into the gap.

Difficulty is also often encountered in insuring that the two joint portions are aligned depthwise of the length of strip steel; a joint is prone to shearing under load if the two cutting edges are not in line in this respect.

It is accordingly a primary object of the present invention to provide an improved strip steel cutting die having a joint between two cooperative joint portions contrived to overcome the above difficulties.

Another object of the invention is the provision of an improved method of forming a joint between joint portions of a strip steel cutting die which will facilitate the formation of a strong, accurate joint.

To these ends and in accordance with a feature of the invention in its article aspect, there is provided a strip steel cutting die comprising a first joint portion having a cutting edge and a transverse end face comprising a first part extending from and at an obtuse angle to the cutting edge, and a second joint portion having a cutting edge and a transverse end face comprising a first part extending from and at an acute angle to the cutting edge, the sum of said obtuse and acute angles being less than 180°, said two joint portions being bonded together in end-to-end relationship touching at their cutting edges, said angles providing a narrow gap between said first parts converging toward the cutting edges which gap insures a good bond by drawing in brazing material or other suitable bonding compounds through capillary action.

In a preferred embodiment, said first and second joint portions each have an end face comprising in addition to said first part, a second part extending from said first part substantially parallel to the cutting edge and a third part extending from the second part to a base surface of the portion. The second parts define abutting shoulders for aiding heightwise alignment of the joint portions and serve to take strains put on the joint by uneven pressure application in use.

The above and other of the various objects and several features of the present invention will become clearer from the following description, to be read with the accompanying drawings, of three illustrative strip steel cutting dies each embodying the invention and each comprising two bonded joint portions preformed to facilitate the making of a strong, close joint of the cutting die. It is to be understood that these three illustrative cutting dies have been selected by way of illustration of the invention only, and not by way of limitation thereof.

In the accompanying drawings:

FIG. 1 is an angular view of a first illustrative cutting die embodying the invention;

FIG. 2 is a view on an enlarged scale of two joint portions of the die shown in FIG. 1;

FIG. 3 is an angular view of one of the joint portions shown in FIG. 2;

FIG. 4 is a view of the two joint portions shown in FIG. 2 disposed in end-to-end relationship;

Figure 5:
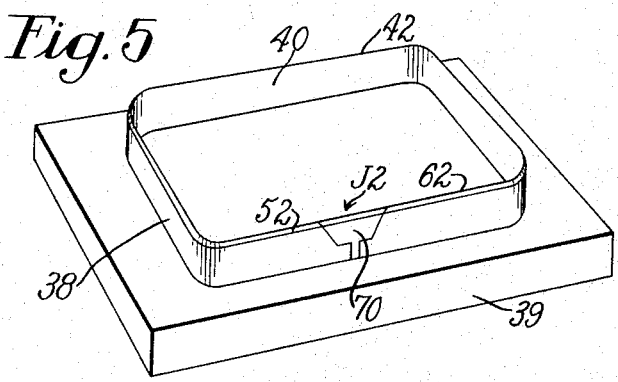
FIG. 5 is an angular view of a second illustrative cutting die having an insert.
Figure 6:
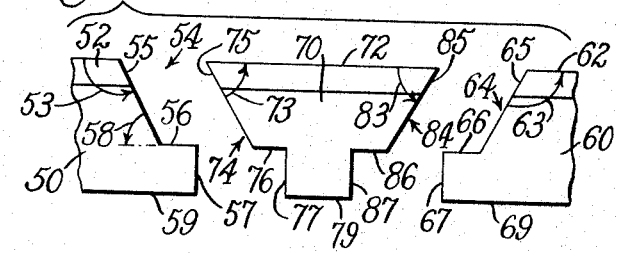
FIG. 6 is a view on an enlarged scale of two joint portions and an insert of the die shown in FIG. 5 shown in separated relation.

The first illustrative cutting die 8 shown in FIG. 1 comprises a supporting block 9, a length 10 of strip steel having a cutting edge 12, and a joint J1 between end faces 24 and 34 of first and second joint portions 20 and 30 (FIG. 2) respectively, of length 10.

The end faces 24 and 34 of the two joint portions 20 and 30 are provided by a blanking operation, each end face comprising first, second and third, planar parts which extend transversely across the thickness of the portion. The first part 25 of the end face 24 of the portion 20 extends from the cutting edge 22 inclined at an obtuse angle 23 thereto; the second part 26 extends from the first part 25 at an acute included angle 28 thereto and parallel to the cutting edge 22 of the portion 20; the third part 27 extends from the second part 26 at right angles thereto to a base face 29 of the portion 20.

The end face 34 of the portion 30 comprises first, second and third planar parts extending transversely across the thickness of the portion 30. The first part 35 extends from the cutting edge 32 inclined at an acute angle 33 thereto; the second part 36 extends from the first part 35 at an obtuse included angle thereto parallel to the cutting edge 32 of the portion 30, and is located a distance from the cutting edge 32 equal to the distance of the second part 26 from the cutting edge 22 thus to aid heightwise alignment and reinforce the joint in use as aforesaid; the third part 37 extends from the second part 36 at right angles thereto to a base face 39 of the portion 30.

The sum of the said obtuse and acute angles 23 and 33 is a little less than 180°, the obtuse angle 23 being illustrated as 118½°, and the acute angle 33 as being 60°. Preferably, the obtuse angle is between 100° and 160°, the acute angle is between 20° and 80°, and the sum of the angles is between 175° and 179°.

The length 10 of strip steel is formed to a desired shape with the two portions 20 and 30 in end-to-end relationship (FIG. 4) with the second part 26 abutting against the second part 36, and with their cutting edges 22 and 32 in line, the two portions 20 and 30 touching at their cutting edges. Adjacent parts of the end faces are then brazed together, providing a continuous cutting edge of the joint J1 of the die 8, and a narrow gap 21 between the two first parts converging on the continuous cutting edge at 1½° as illustrated.

The die 8 is then secured to a rectangular block 9 of wood, the cutting edge 12 lying in a plane parallel to upper and lower surfaces of the block 9, and may then be used to cut fabric or the like material.

The second illustrative die (FIG. 5) comprises a length 40 of strip steel comprising a cutting edge 42 and a joint J2 between first and second joint portions 50 and 60 each comprising a cutting edge 52 and 62, respectively, and an insert 70 of the knife 38.

The two joint portions 50 and 60 of the length 40 are each provided with an end face 54 and 64, respectively, by a blanking operation.

The end face 54 of the portion 50 comprises first, second and third, planar parts which extend transversely across the thickness of the portion; the first part 55 extends from the cutting edge 52 inclined at an obtuse angle 53 thereto; the second part 56 extends from the first part 55 at an acute included angle 58 thereto and parallel to the cutting edge 52 of the portion 50; the third part 57 extends from the second part 56 at right angles thereto to a base face 59 of the portion 50.

The end face 64 of the portion 60 comprises first, second and third, planar parts which extend transversely across the thickness of the portion 60; the first part 65 extends from the cutting edge 62 inclined at an obtuse angle 63 thereto; the second part 66 extends from the first part 65 at an acute included angle thereto and parallel to the cutting edge 62 of the portion 60; the third part 67 extends from the second part 66 at right angles thereto to a base face 69 of the portion 60.

The length 40 is then formed to a desired shape with the end faces 54 and 64 of the two portions 50 and 60 facing, and the cutting edges 52 and 62 in line. The distance between the two portions at their cutting edges is measured. The insert 70 is then provided by a blanking operation with two, opposed, first and second end faces 74 and 84 respectively, which end faces separated at a cutting edge 72 of the insert by a distance equal to the aforementioned measured distance between the portions 50 and 60.

The insert 70 is of strip steel, has a cross-section similar to cross-sections of the portions 50 and 60, and is symmetrical about a plane extending transversely across the thickness thereof and lying at right angles to the cutting edge 72.

The end face 74 of the insert 70 comprises first, second and third, planar parts which extend transversely across the thickness of the insert 70; the first part 75 extends from the cutting edge of an acute angle 73 thereto; the second part 76 extends from the first part 75 at an obtuse included angle thereto and parallel to the cutting edge 72; the second part 76 is located a distance from the cutting edge 72 equal to the distance of the second part 56 from the cutting edge 52; the third part 77 extends from the second part 76 at right angles thereto to a base face 79 of the insert 70.

The end face 84 of the insert 70 comprises first, second and third planar parts which extend transversely across the thickness of the insert 70; the first part 85 extends from the cutting edge 72 inclined at an acute angle 83 thereto; the second part 86 extends from the first part 85 at an obtuse included angle thereto and parallel to the cutting edge 72, and is located a distance from the cutting edge 72 equal to the distance of the second part 66 from the cutting edge 62; the third part 87 extends from the second part 86 at right angles thereto to the base face 79 of the insert 70.

The sum of the obtuse angle 53 and the acute angle 73 and the sum of the obtuse angle 63 and the acute angle 83 are both a little less than 180°, the two obtuse angles 53 and 63 are both illustrated as being 118½°, and the two acute angles 73 and 83 are illustrated as both being 60°. Preferably the obtuse angles, the acute angles, and their sums are within the limits prescribed above for the first illustrative die.

Figure 7:
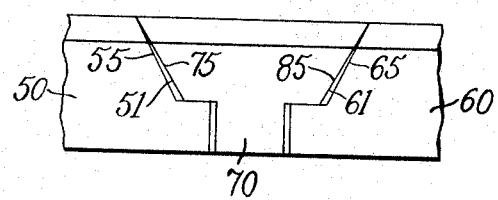
FIG. 7 is a view of the two joint portions and the insert shown in FIG. 6 disposed in end-to-end relationship.

The insert 70 is then positioned between the two portions 50 and 60 with the three in end-to-end relationship with the second parts 76 and 86 of the two end faces 74 and 84 of the insert 70 abutting against the second part 56 of the end face 54 of the portion 50 and the second part 66 of the end face 64 of the portion 60, respectively, the cutting edge 72 of the insert 70 touching the two joint portions at their cutting edges 52 and 62 thereby to provide a continuous cutting edge of the joint J2 of the die 38, two narrow gaps 51 and 61 (see FIG. 7) between adjacent first parts 55 and 75; 65 and 85, respectively, each converging at 1½° on the continuous cutting edge.

The two joint portions and the insert are heated, and adjacent parts of the end faces bonded together by brazing. The die 48 is then secured to a rectangular block 39 of wood (FIG. 5), the cutting edge 42 lying in a plane parallel to upper and lower surfaces of the block 39, and may then be used to cut fabric or the like material.

Having thus described our invention, what we claim as new and desire to secure by Letters Patent of the United States is:

1. In a strip steel cutting die, a first joint portion having a cutting edge and a transverse end face, said end face comprising a first part extending from and at an obtuse angle to the cutting edge, and a second joint portion having a cutting edge and a transverse end face comprising a first part extending from and at an acute angle to the cutting edge, the sum of said obtuse and acute angles being less than 180°, said two joint portions being bonded together in an end-to-end relationship wherein said end faces abut at their cutting edges and form a narrow gap between said first parts converging toward the cutting edges.

2. A strip steel cutting die as in claim 1 in which each of said end faces additionally comprises a second part extending from said first part substantially parallel to the cutting edge of the joint portion, and a third part extending from the second part to a base surface of the portion, the two second parts being at equal distances from the cutting edges of the two portions, and providing abutting surfaces to facilitate heightwise alignment and reinforcement of the joint portions.

3. A strip steel die as defined in claim 1 wherein said sum is between 175° and 179°.

4. A strip steel die as defined in claim 1 wherein said obtuse angle is between 100° and 160°, said acute angle is between 20° and 80° and said sum is between 175° and 179°.

5. A strip steel die as defined in claim 4 in which each of said end faces generally comprises a second part extending from said first part substantially parallel to the cutting edge of the joint portion, and a third part extending from the second part to a base surface of the portion, the two second parts being at equal distances from the cutting edges of the two portions.

6. In the method of making a strip steel die which comprises making a joint between two joint portions of strip steel each comprising a cutting edge, the improvement which comprises conforming one of said joint portions with a transverse end face having a first part extending at an obtuse angle from the cutting edge, forming on the other portion a transverse end face having a first part extending at an acute angle from the cutting edge, the sum of the obtuse angle and the acute angle being less than 180°, assembling the two portions in end-to-end relationship in contact at their cutting edges with a narrow gap between the two first partes converging on the cutting edge, and bonding the two portions together.

7. In the method of making a strip steel cutting die comprising making a joint between two joint portions of strip steel provided with a longitudinal cutting edge, the improvement which comprises forming on one of said portions a transverse end face comprising a first part extending at an obtuse angle from the cutting edge, a second part extending substantially parallel to the cutting edge and a third part extending from the second part to a base surface of the portion, forming on the other portion a transverse end face having a first part extending from the cutting edge at an acute angle from the cutting edge, a second part extending substantially parallel to the cutting edge and a third part extending from the second part to a base surface of the portion, the sum of said obtuse angle and said acute angle being less than 180° and said two second parts being at equal distances from the cutting edges of the portions, assembling the two portions in end-to-end relationship with the second parts of the two end faces abutting and the two portions in engagement at their cutting edges, and bonding the two portions together.

References Cited

UNITED STATES PATENTS

| | | | |
|---|---|---|---|
| 1,722,025 | 7/1929 | Wagener | 29—483 X |
| 2,160,437 | 5/1939 | Martin | 76—107 |
| 3,182,530 | 5/1965 | Scott et al. | 76—107 |

ANDREW R. JUHASZ, *Primary Examiner.*